(12) United States Patent
Forgang et al.

(10) Patent No.: US 8,354,846 B2
(45) Date of Patent: Jan. 15, 2013

(54) METHOD AND APPARATUS FOR REDUCING EFFECT OF TOOL ECCENTRICITY IN A BOREHOLE ON MULTI-AXIAL INDUCTION MEASUREMENTS

(75) Inventors: Stanislav W. Forgang, Houston, TX (US); Luis M. Pelegri, Humble, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 242 days.

(21) Appl. No.: 12/824,551

(22) Filed: Jun. 28, 2010

(65) Prior Publication Data

US 2011/0001481 A1    Jan. 6, 2011

Related U.S. Application Data

(60) Provisional application No. 61/222,746, filed on Jul. 2, 2009.

(51) Int. Cl.
*G01V 3/18* (2006.01)
(52) U.S. Cl. ........................................ 324/339
(58) Field of Classification Search ........... 324/337–339
See application file for complete search history.

(56) References Cited

U.S. PATENT DOCUMENTS

| | | | |
|---|---|---|---|
| 6,470,274 B1 | 10/2002 | Mollison et al. | |
| 6,493,632 B1 | 12/2002 | Mollison et al. | |
| 6,643,589 B2 | 11/2003 | Zhang et al. | |
| 6,686,736 B2 | 2/2004 | Schoen et al. | |
| 2005/0068036 A1* | 3/2005 | Wang et al. | 324/338 |
| 2005/0168349 A1 | 8/2005 | Huang et al. | |
| 2008/0018335 A1 | 1/2008 | Chemali et al. | |
| 2008/0061789 A1 | 3/2008 | Coates et al. | |
| 2008/0234938 A1 | 9/2008 | Niemeyer et al. | |

OTHER PUBLICATIONS

Moran, J.H. et al., "Basic Theory of Induction Logging and Application to Study of Two-Coil Sondes," Geophysics, vol. 27, No. 6, part 1, pp. 829-858, Society of Exploration Geophysicists, Dec. 1962.

* cited by examiner

*Primary Examiner* — Jay Patidar
(74) *Attorney, Agent, or Firm* — Mossman Kumar & Tyler PC (57) ABSTRACT

An apparatus, method and computer-readable medium are provided for estimating a resistivity property of an earth formation. A logging tool includes a first antenna arrangement and a second antenna arrangement of the logging tool; and at least one device for maintaining the first antenna arrangement and the second antenna arrangement in proximity to a wall of the borehole. The first antenna arrangement and the second antenna arrangement may be at substantially the same axial location on the logging tool. Alternately, the first antenna arrangement and the second antenna arrangement may be at different axial positions on the logging tool. Extendible arms of the logging tool are configured to extend one or more of the first antenna arrangement and the second antenna arrangement against a face of the borehole.

20 Claims, 9 Drawing Sheets

METHOD AND APPARATUS FOR REDUCING EFFECT OF TOOL ECCENTRICITY IN A BOREHOLE ON MULTI-AXIAL INDUCTION MEASUREMENTS

CROSS-REFERENCES TO RELATED APPLICATIONS

This application claims priority from U.S. Provisional Patent Application Ser. No. 61/222,746 filed on Jul. 2, 2009.

BACKGROUND OF THE DISCLOSURE

1. Field of the Disclosure

The disclosure is related generally to measuring induction in a borehole and provides an apparatus and methods for reducing the effects of borehole currents in induction measurements.

2. Background of the Art

Electromagnetic induction resistivity well logging instruments are well known in the art and are used to determine the electrical conductivity, and its converse, resistivity, of earth formations penetrated by a borehole. In electromagnetic induction resistivity well logging, eddy currents are induced in a region of the formation adjoining the borehole. These eddy currents give rise to magnetic fields having properties that are related to the region of the formation. Formation conductivity may be determined by measuring these magnetic fields. The formation conductivity is used for, among other things, inferring a fluid content of the earth formations. For example, low conductivity (high resistivity) is typically associated with hydrocarbon-bearing earth formations. The physical principles of electromagnetic induction well logging are well described, for example, in J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to the electromagnetic induction resistivity instruments described in the Moran and Kunz reference have been made. In an exemplary modification, a multi-component logging tool includes transmitters and receivers substantially oriented along axes of an orthogonal coordinate system associated with the logging tool.

When logging an earth formation, various non-formation effects may arise which may degrade the accuracy of the log. Typical non-formation effects include signals induced in a borehole mud, signals due to eccentricity of the logging tool within the borehole, signals resulting from misalignment of transmitters and or receivers with respect to the tool axis, among others. Tool eccentricity within the borehole generally causes more non-formation effects in transverse (X-oriented or Y-oriented) transmitters and receivers than in longitudinal (Z-oriented) transmitters and receivers. These borehole eccentricity effects are generally at a minimum when the magnetic fields produced by the currents circulating in the mud near the receivers cancel each other. This cancellation often takes place when the logging tool is positioned at the center of the borehole. However, maintaining this central position in horizontal boreholes or in highly-deviated boreholes is either difficult or unattainable using present logging tool designs. A deviated borehole is one in which the axis of the borehole is inclined to the vertical, Thus, there is a need for a logging tool that reduces borehole effects in multi-component resistivity measurements.

SUMMARY OF THE DISCLOSURE

One embodiment of the disclosure is an apparatus configured to evaluate an earth formation. The apparatus includes: a carrier configured to be conveyed in a borehole; a first extension member configured to position a first contact member in proximity to a wall of the borehole; a second extension member configure to position a second contact member in proximity to the wall of the borehole at an azimuth different from an azimuth of the first contact member; and at least one sensor on the first contact member and at least one sensor on the second contact member configured to make measurements indicative of a property of the earth formation.

Another embodiment of the disclosure is a method of evaluating an earth formation. The method includes: conveying a carrier into a borehole; using a first extension member on the carrier to position a first contact member in proximity to a wall of the borehole and use at least one sensor on the first contact member to make a first measurement indicative of the property; and using a second extension member on the carrier to position a second contact member in proximity to the wall of the borehole at an azimuth different from an azimuth of the first contact member and use at least one sensor on the second contact member to make a second measurement indicative of the property of the earth formation.

Another embodiment of the disclosure is a computer-readable medium product having stored thereon instructions that when read by a least one processor enable the at least one processor to execute a method. The method includes: estimating a value of a resistivity property of an earth formation using a first signal obtained by a first receiver antenna responsive to activation of a first transmitter antenna, and a second signal produced by a second receiver antenna responsive to activation of a second transmitter antenna, the first transmitter antenna and the first receiver antenna being conveyed on a carrier into a borehole and having axes in a first direction substantially orthogonal to a longitudinal axis of the logging tool and being positioned in proximity to a wall of the borehole using a first extension member, the second transmitter antenna and the second receiver antenna being conveyed on the logging tool into the borehole and having axes in a second direction substantially orthogonal to the longitudinal axis of the logging tool and the first direction and being positioned in proximity to a wall of the borehole using a second extension member.

BRIEF DESCRIPTION OF THE FIGURES

The present disclosure is best understood with reference to the following figures in which like numbers refer to like components and in which.

DETAILED DESCRIPTION OF THE DISCLOSURE

Figure 1:
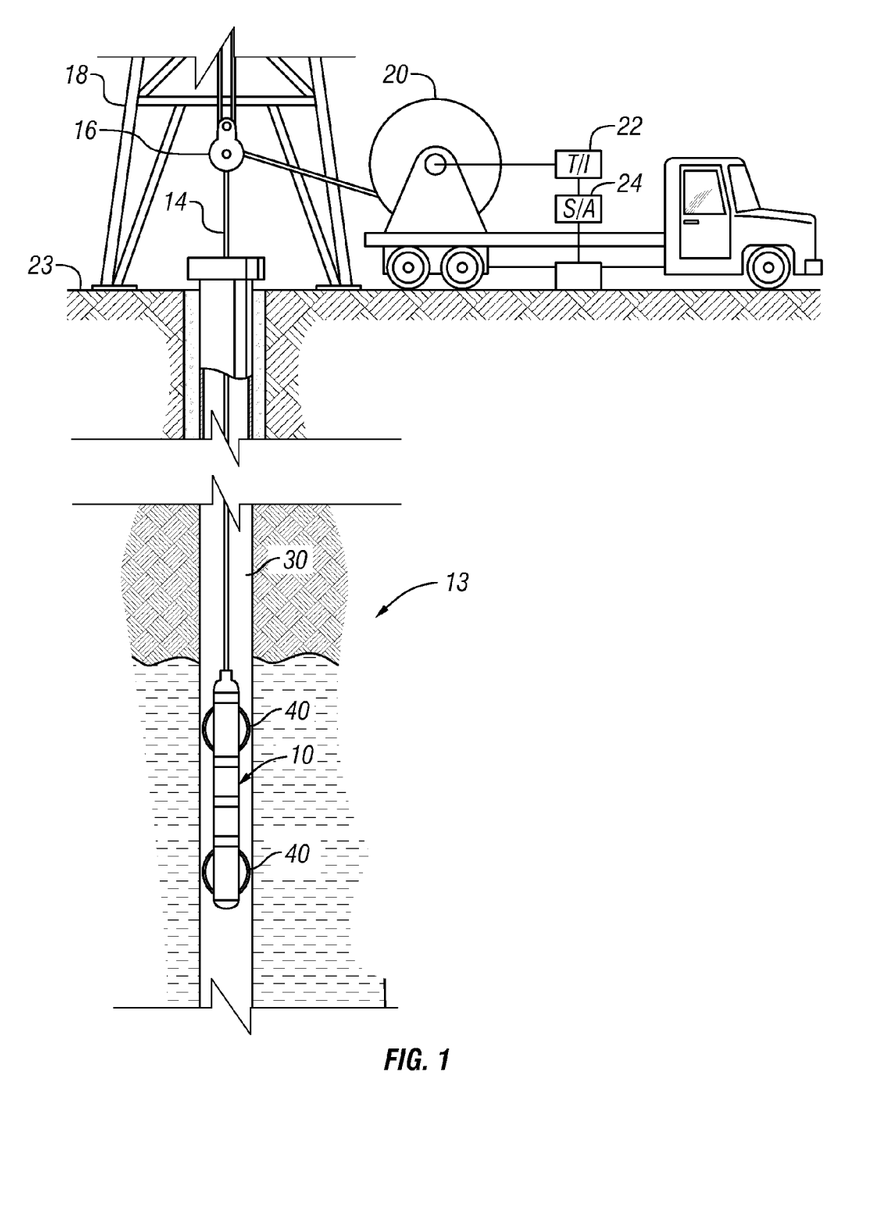
FIG. 1 shows a wireline system for conveying an exemplary well logging instrument of the present disclosure into a borehole.

FIG. 1 shows an exemplary tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. In one embodiment of the disclosure, centralizers 40 keep the mandrel maintained in a position close to the center of the borehole 30.

The tool 10 includes induction transmitter and receiver coils, as will be further explained, for inducing electromagnetic fields in the earth formations and for receiving voltage signals induced by eddy currents flowing in the earth formations as a result of the electromagnetic fields induced therein. For the purposes of the present disclosure, the mandrel may be referred to as a carrier.

Figure 2:
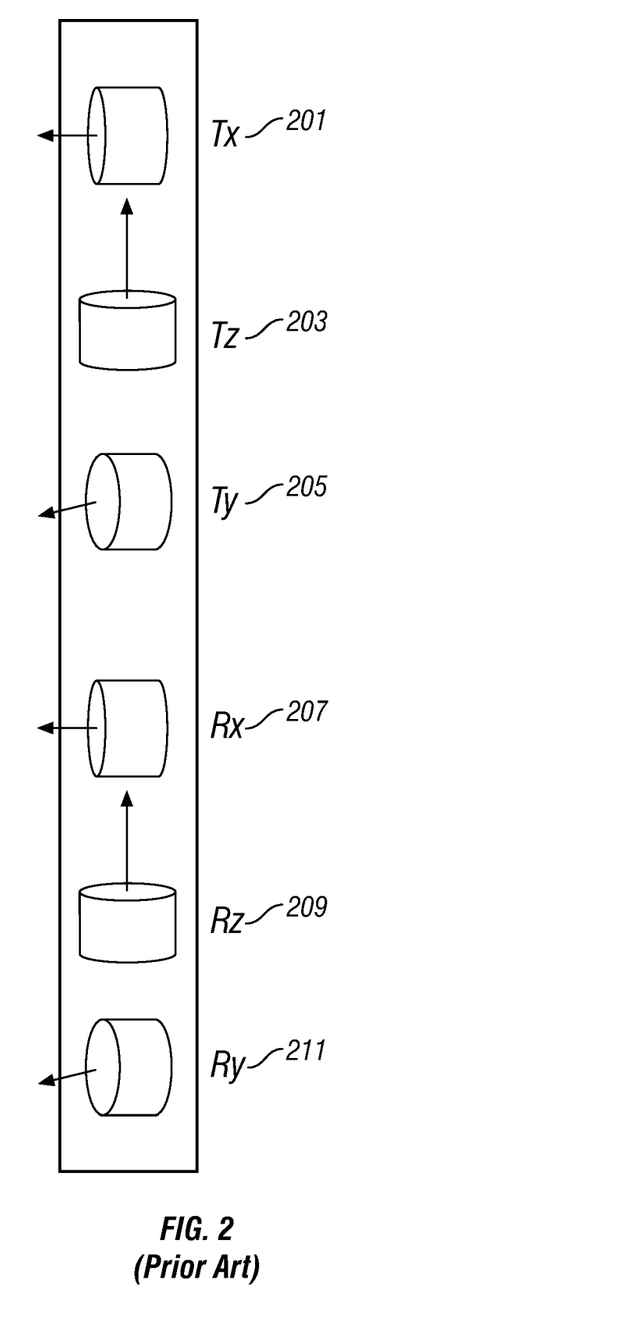
FIG. 2 (Prior Art) shows an exemplary logging instrument for obtaining multi-component induction measurements.

FIG. 2 shows an exemplary multi-component induction logging instrument used in resistivity well logging. The logging instrument of FIG. 2 is shown for illustrative purposes only. A rectilinear coordinate system is defined with respect to the logging instrument wherein the Z-axis of the coordinate system is oriented along the longitudinal axis of the logging instrument and X and Y axes are orthogonal to the longitudinal axis. Three orthogonal transmitter coils 201, 203 and 205 that are referred to as the $T_x$, $T_z$, and $T_y$ transmitters are shown. The indices indicate the respective directions of orientation, i.e. $T_x$ is oriented along the x-axis. Receiver coils 207, 209 and 211, referred to as the $R_x$, $R_z$, and $R_y$ receivers, correspond respectively to transmitters 201, 203 and 205. Magnetic fields in an earth formation resulting from activation of a particular transmitter are subsequently recorded at a selected receiver. The magnetic field is generally referred to using indices that indicate the orientation of the transmitter and receiver used. Thus $H_{xy}$, for example, indicates the response of a magnetic field generated by the $T_x$ transmitter and subsequently recorded at the $R_y$ receiver. In one mode of operation of the tool, the $H_{xx}$, $H_{yy}$, $H_{zz}$, $H_{xy}$, and $H_{xz}$ components are measured. Other components may also be measured depending on the use of the logging instrument.

Figure 3A:
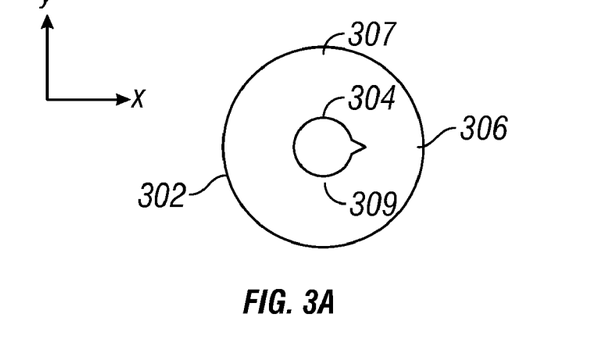
FIGS. 3A-C show cross-sectional views of a logging tool at various positions within a borehole.
Figure 3B:
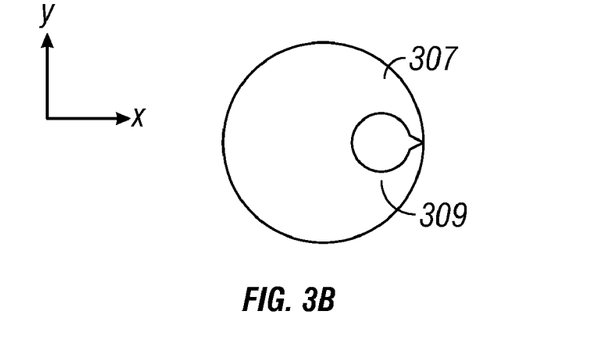
Figure 3C:
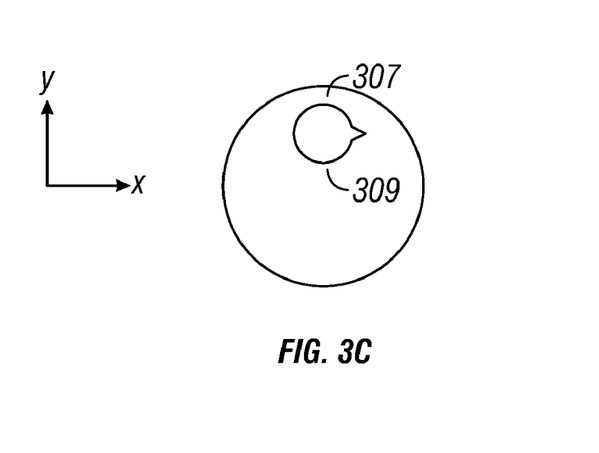

FIGS. 3A-C show cross-sectional views of an exemplary induction logging tool located at different positions within a borehole. The borehole effect is generally related to the behavior of current flowing in the borehole mud, which is generally related to the degree and type of eccentricity of the logging tool within the borehole. An x-oriented transmitter is shown for illustrative purposes. FIG. 3A shows an x-oriented transmitter 304 that is centered within borehole 302 filled with mud 306. Current is typically induced in the borehole mud when the x-oriented transmitter 304 is activated. In one aspect, the current induced in the borehole flows in one axial direction along axial channel 307 and in an opposite axial direction along axial channel 309. Due to the symmetry of the current flow channels 307 and 309, the current flowing in these channels does not create a substantial borehole effect. In FIG. 3B, the x-oriented transmitter 304 is decentralized along the x-direction. Although, the x-oriented transmitter is decentralized, the current flow channels 307 and 309 are relatively symmetrical to each other. Due to this symmetry, the current flowing in these channels are relatively equal and thus do not create a substantial borehole effect. FIG. 3C shows the x-oriented transmitter 304 decentralized along the y-axis. Due to the direction of decentralization, channel 307 is constricted while the channel 309 is broadened. In addition to the difference in channel widths, current flowing in channel 307 generally interacts with the formation to a greater amount than current flowing in channel 309. As a result, a substantial borehole effect is present when the x-oriented transmitter 304 is decentralized along the y-axis. Because induction current density increases as mud conductivity increases, borehole effects are stronger when mud having a higher conductivity is present in the borehole.

Similar reasoning using a y-oriented transmitter shows that (i) when the y-oriented transmitter is at the center of the borehole, there is no substantial borehole effect, (ii) when the y-oriented transmitter is decentralized along the x-axis, there is a substantial borehole effect, and (iii) when the y-oriented transmitter is decentralized along the y-axis, there is no substantial borehole effect. Also, for a z-oriented transmitter the borehole effect is not substantial. The borehole effects may be present even when the centralizers 40 are used to position the tool 10 in the borehole 10.

Figure 4A:
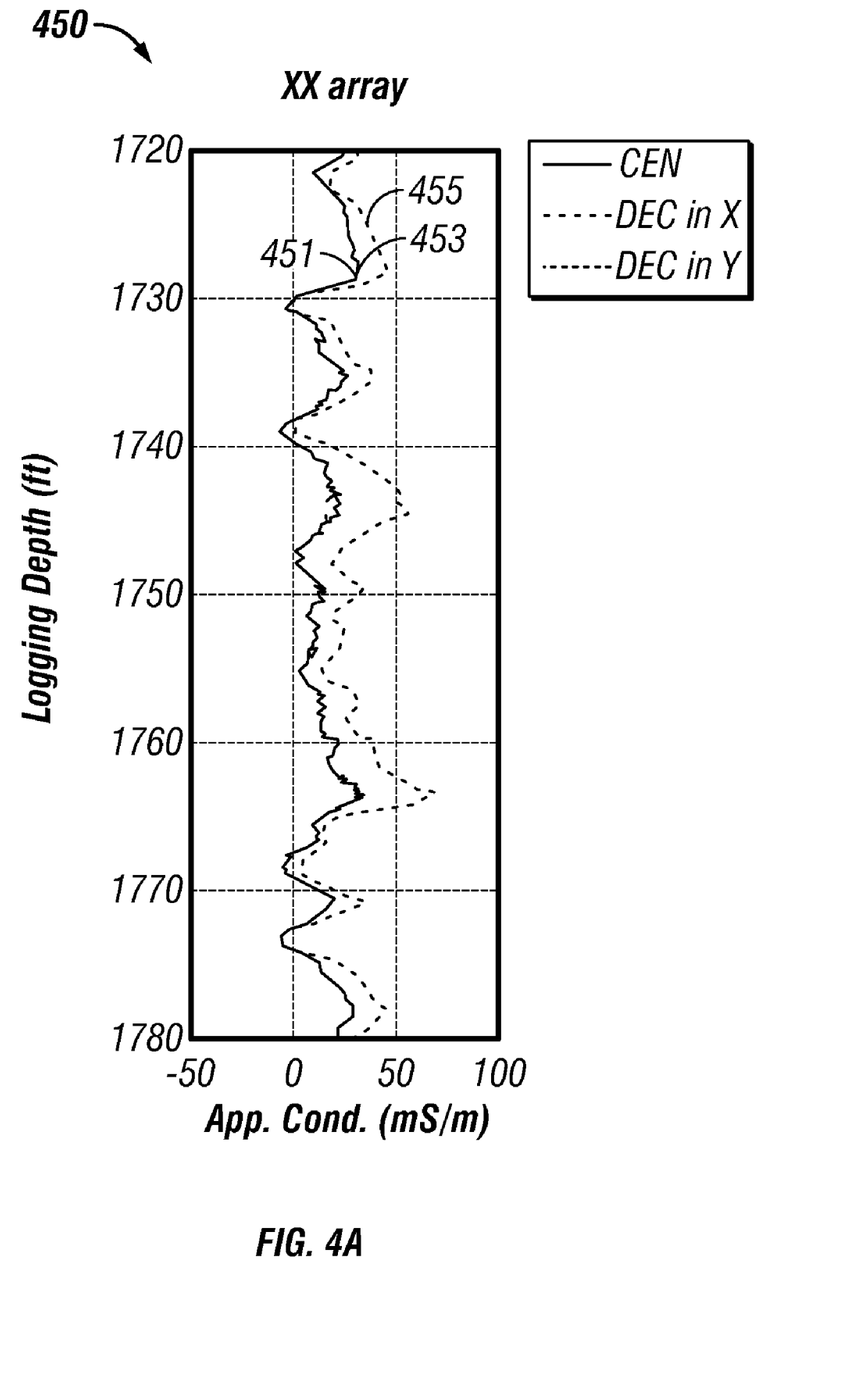
FIGS. 4A-C shows various induction resistivity logs obtained using the exemplary induction logging tool of FIG. 2 under the tool eccentricities of FIGS. 3A-C.

FIGS. 4A-C shows various induction resistivity logs 450, 460 and 470 obtained using the exemplary induction logging tool of FIG. 2. Each resistivity log is obtained under the tool eccentricities illustrated in FIGS. 3A-C. FIG. 4A shows resistivity log 450 of $H_{xx}$ obtained using an X-oriented transmitter and an X-oriented receiver. For log 451 the logging tool is centered within the borehole. For log 453 the logging tool is displaced in the x-direction; and for log 455 the logging tool is displaced in the y-direction. The logs 451 and 453 agree with each other, while log 455 is different from logs 451 and 453.

Figure 4B:
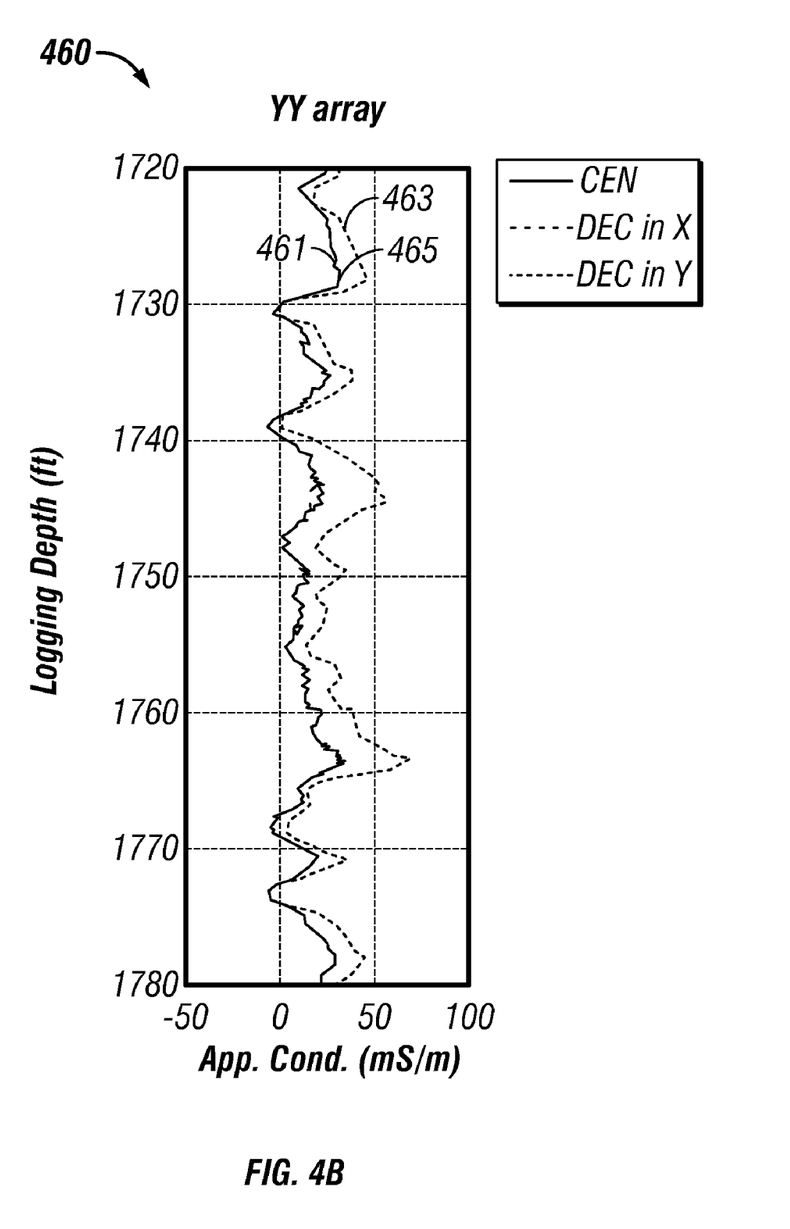

FIG. 4B shows resistivity log 460 of $H_{yy}$ obtained using a Y-oriented transmitter and a Y-oriented receiver. For log 461 the logging tool is centered within the borehole. For log 463 the logging tool is displaced in the x-direction; and for log 465 the logging tool is displaced in the y-direction. The logs 461 and 465 agree with each other, while log 463 is different from logs 461 and 465.

Figure 4C:
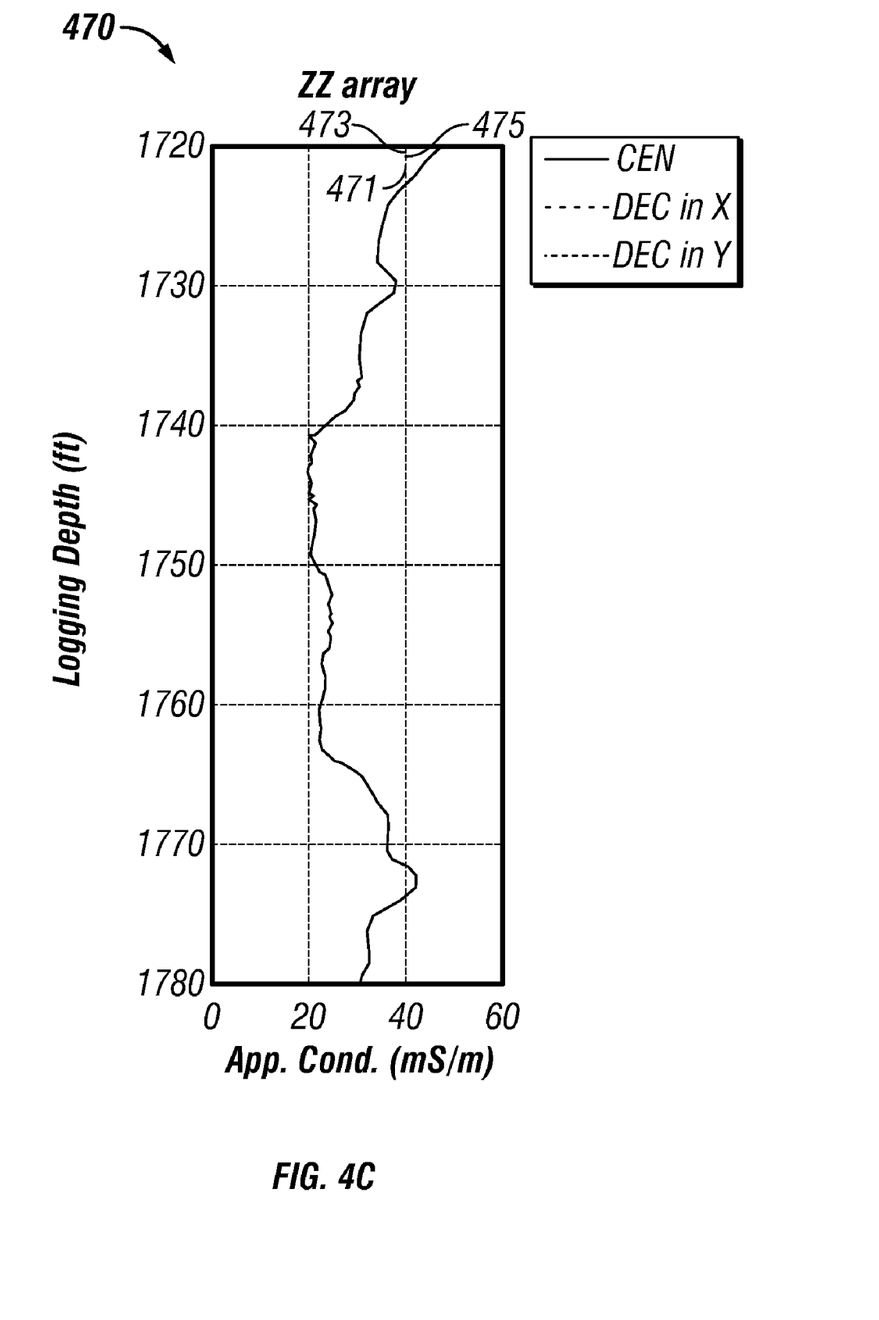

FIG. 4C shows resistivity log 470 of $H_{zz}$ obtained using a Z-oriented transmitter and a Z-oriented receiver. For log 471 the logging tool is centered within the borehole. For log 473 the logging tool is displaced in the x-direction; and for log 475 the logging tool is displaced in the y-direction. The logs 471, 473 and 475 agree with each other.

Figure 5:
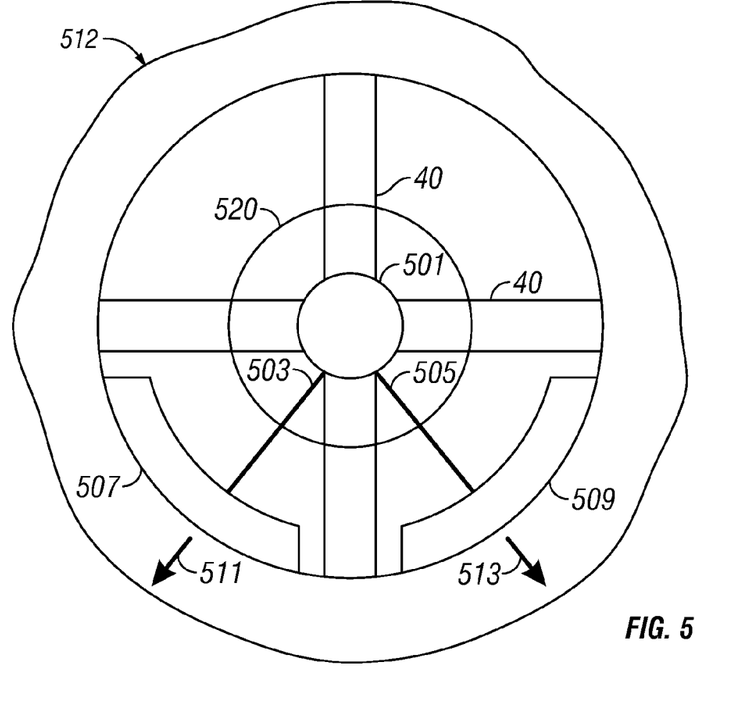
FIG. 5 shows a cross-sectional view of an exemplary logging tool of the present disclosure using an extension member and a contact member for obtaining resistivity measurements.

FIG. 5 shows a cross-sectional view of an exemplary logging tool of the present disclosure for obtaining resistivity measurements. The logging tool includes contact members such as pads 507 and 509 that are at one end of extension arms such as extendable arms 503 and 505, respectively. Pad 507 includes a first antenna arrangement having a first transmitter antenna and a first receiver antenna having axes oriented in a first direction 511 substantially orthogonal to a longitudinal axis of the logging tool. Pad 509 includes a second antenna arrangement having a second transmitter antenna and a second receiver antenna having axes oriented in a second direction 513 substantially orthogonal to a longitudinal axis of the logging tool. In an exemplary embodiment, the two pads may be an X-oriented pad and a Y-oriented pad that are substantially orthogonal to each other, i.e., they have azimuths close to 90° apart. Extendable arms 503 and 505 are attached to mandrel 501. The pads 507 and 509 may be brought independently into contact with borehole wall 512 by extending the extendible arms 503 and 505, respectively. Persons versed in the art and having benefit of the present disclosure would recognize that if the azimuthal separation of the pads is close to 90°, processing of the acquired data is less complicated.

However, having the azimuthal separation of the pads equal to 90° is not essential because if the relative angle is known, then using a rotation of coordinates, it is possible to simulate measurements at a 90° orientation.

The logging tool includes at least one processor configured to activate the first transmitter antenna and the second transmitter. Signals received by the first receiver antenna and the second receiver antenna in response to the activation of the first transmitter antenna and the second transmitter antenna may be used to estimate a resistivity property of the earth formation. The resistivity property may include a horizontal resistivity of the earth formation, a vertical resistivity of the earth formation, a dip of the formation, an azimuth of the formation, a sand fraction, and a water fraction, among others. The estimated resistivity property may be subsequently recorded to a suitable storage medium.

The apparatus may further include a third transmitter antenna 520 having an axis of orientation substantially parallel to the longitudinal axis of the logging tool (i.e., a Z-oriented transmitter antenna). The at least one processor may be configured to activate the third transmitter antenna 520 and to use signals received by the first receiver antenna and the second receiver antenna in response to activation of the third transmitter antenna to estimate the resistivity property of the earth formation.

Figure 6A:
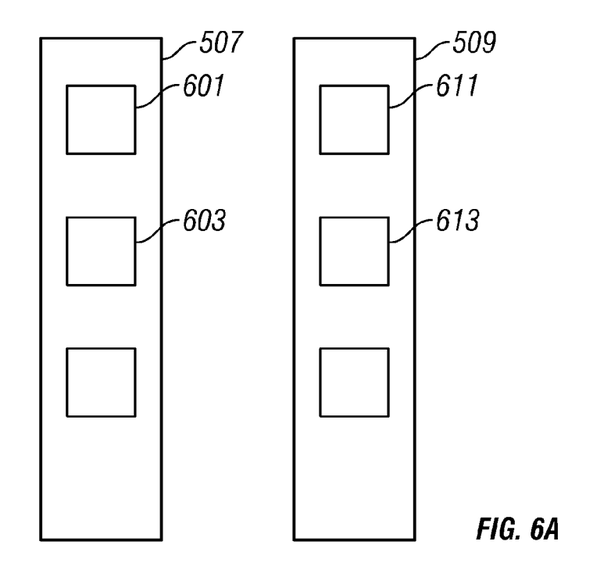
FIGS. 6A-B show side views of the pads of the exemplary logging tool of FIG. 5.
Figure 6B:
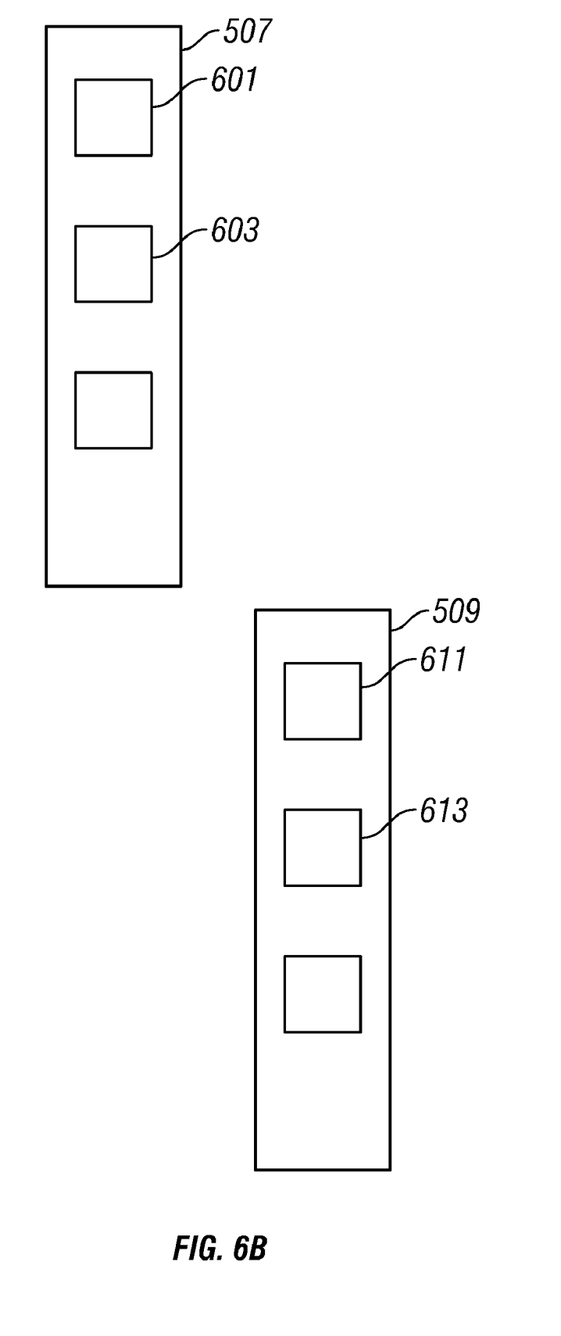

FIGS. 6A-B shows side views of pads 507 and 509. FIG. 6A shows the two pads 507 and 509 located at the same axial position of the logging tool. Pad 507 includes the first antenna arrangement including first transmitter antenna 601 and first receiver antenna 603. Pad 509 include the second antenna arrangement including second transmitter antenna 611 and second receiver antenna 613. In one aspect, each pad may be moved independently along the axial length of the logging tool. FIG. 6B shows the two pads 507 and 509 located at different axial positions.

Figure 7:
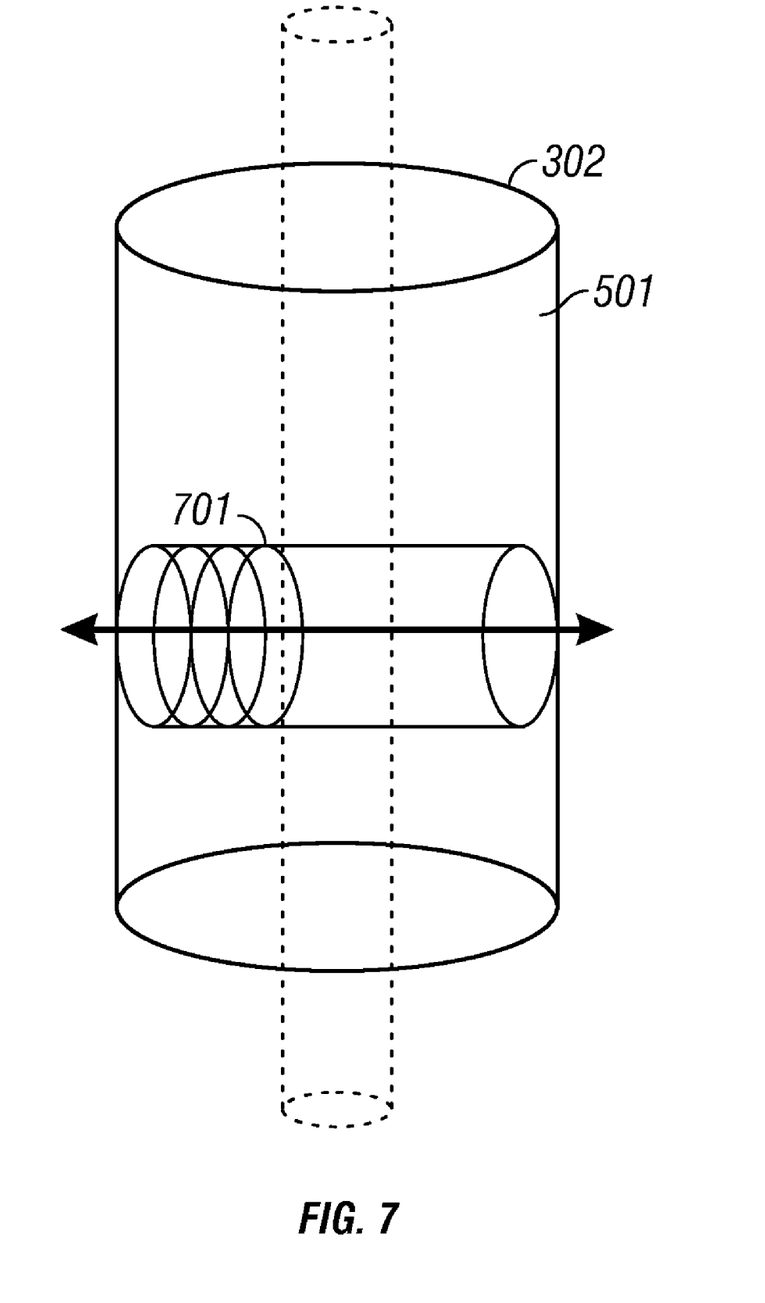
FIG. 7 shows an embodiment of the present disclosure using a spring as an extension member.

In another embodiment of the disclosure, the extension member may be a coil spring 701 as shown in FIG. 7. The extension member may be constructed with sufficient strength to centralize the tool 10 while in operation. Alternatively, separate centralizers may be used.

The measurements made by the logging tool may be used to determine a property of an earth formation. Methods of determination of such properties of the earth formation are discussed, for example, in U.S. Pat. No. 6,493,632 to Mollison et al., U.S. Pat. No. 6,470,274 to Mollison et al., and U.S. Pat. No. 6,686,736 to Schoen et al., having the same assignee as the present disclosure and the contents of which are incorporated herein by reference. Such properties include vertical and horizontal resistivities, sand fraction and water saturation. In addition, properties such as formation dip and azimuth may be determined using methods discussed in U.S. Pat. No. 6,643,589 to Zhang et al., having the same assignee as the present disclosure and the contents of which are incorporated herein by reference. The results of such analysis are output to a suitable medium and used for making decisions regarding reservoir development including well completion, running of other logs, and drilling of additional wells.

Data processing may be accomplished with the use of a computer program implemented on a suitable computer-readable medium that enables a circuitry, such as a processor, to perform and control the processing. The term 'processor' as employed in this application is used in its traditionally broad sense and is intended to include such devices as single-core computers, multiple-core computers, distributed computing systems, field programmable gate arrays (FPGAs) and the like. The computer-readable medium referenced in this disclosure is any medium that may be read by a machine and may include magnetic media, RAM, ROM, EPROM, EAROM, flash memory and optical disks. In addition, results of the processing may be stored on a suitable medium. The processing may occur downhole or at a surface location or at a remote location. The processing may be done substantially in real time or at a time subsequent to acquisition of the data. In an alternative embodiment, part of the processing may be done downhole with the remainder conducted at the surface location.

While the foregoing disclosure is directed to the exemplary embodiments of the disclosure, various modifications will be apparent to those skilled in the art. It is intended that all variations within the scope of the appended claims be embraced by the foregoing disclosure.

What is claimed is:

1. An apparatus configured to evaluate an earth formation, the apparatus comprising:
   a carrier configured to be conveyed in a borehole;
   a first extension member configured to position a first contact member in proximity to a wall of the borehole;
   a second extension member configure to position a second contact member in proximity to the wall of the borehole at an azimuth different from an azimuth of the first contact member and selected to reduce a borehole effect; and
   at least one sensor on the first contact member and at least one sensor on the second contact member configured to make measurements indicative of a property of the earth formation.

2. The apparatus of claim 1 further comprising a processor configured to estimate a value of the property of the earth formation using the measurements made by the at least one sensor on the first contact member and the at least one sensor on the second contact member.

3. The apparatus of claim 1 wherein:
   the at least sensor on the first contact member further comprises a first transmitter antenna and a first receiver antenna oriented parallel to the azimuth of the first contact member;
   the at least one sensor on the second contact member further comprises a second transmitter antenna and a second receiver antenna oriented parallel to the azimuth of the second contact member; and
   the property is a resistivity property of the earth formation.

4. The apparatus of claim 3 further comprising a third transmitter antenna oriented parallel to a longitudinal axis of the carrier, and wherein the at least one processor is further configured to use signals received by the first receiver antenna and the second receiver antenna in response to activation of the third transmitter antenna to estimate a resistivity property of the earth formation.

5. The apparatus of claim 3 wherein the resistivity property is at least one of: (i) a horizontal resistivity of the earth formation, (ii) a vertical resistivity of the earth formation, (iii) a dip of the formation, (iv) an azimuth of the formation, (v) a sand fraction, and (vi) a water fraction.

6. The apparatus of claim 1 wherein the at least one sensor on the first contact member is at substantially the same axial location along the carrier as the at least one sensor on the second contact member.

7. The apparatus of claim 1 wherein the first extension member further comprises a spring.

8. The apparatus of claim 1 wherein the first contact member further comprises a pad.

9. The apparatus of claim 1 further comprising a wireline configured to convey the carrier into the borehole.

10. A method of evaluating an earth formation, the method comprising:
- conveying a carrier having into a borehole;
- using a first extension member on the carrier to position a first contact member in proximity to a wall of the borehole and use at least one sensor on the first contact member to make a first measurement indicative of the property; and
- using a second extension member on the carrier to position a second contact member in proximity to the wall of the borehole at an azimuth different from an azimuth of the first contact member and selected to reduce a borehole effect and use at least one sensor on the second contact member to make a second measurement indicative of the property of the earth formation.

11. The method of claim 10 further comprising using a processor for estimating a value of the property of the earth formation using the first measurement and the second measurement.

12. The method of claim 11 further comprising:
- using as the at least sensor on the first contact member a first transmitter antenna and a first receiver antenna oriented parallel to the azimuth of the first contact member; and
- using as the at least one sensor on the second contact member a second transmitter antenna and a second receiver antenna oriented parallel to the azimuth of the second contact member;
- wherein the property is a resistivity property of the earth formation.

13. The method of claim 12 further comprising:
- activating a third transmitter antenna oriented parallel to a longitudinal axis of the carrier,
- and using the processor to estimate a value of the resistivity property of the earth formation using signals received by the first receiver antenna and the second receiver antenna in response to activation of the third transmitter antenna.

14. The method of claim 12 further comprising estimating, for the resistivity property, at least one of: (i) a horizontal resistivity of the earth formation, (ii) a vertical resistivity of the earth formation, (iii) a dip of the formation, (iv) an azimuth of the formation, (v) a sand fraction, and (vi) a water fraction.

15. The method of claim 10 further comprising positioning the at least one sensor on the first contact member at substantially the same axial location along the carrier as the at least one sensor on the second contact member.

16. The method of claim 10 further comprising using, for first contact member, a pad.

17. The method of claim 10 further comprising using a wireline for conveying the carrier into the borehole.

18. The method of claim 10 wherein the borehole comprises a deviated borehole.

19. A non-transitory computer-readable medium product having stored thereon instructions that when read by a least one processor enable the at least one processor to perform a method, the method comprising:
- estimating a value of a resistivity property of an earth formation using a first signal obtained by a first receiver antenna responsive to activation of a first transmitter antenna, and a second signal produced by a second receiver antenna responsive to activation of a second transmitter antenna, the first transmitter antenna and the first receiver antenna being conveyed on a carrier into a borehole and having axes in a first direction substantially orthogonal to a longitudinal axis of the logging tool and being positioned in proximity to a wall of the borehole using a first extension member, the second transmitter antenna and the second receiver antenna being conveyed on the logging tool into the borehole and having axes in a second direction substantially orthogonal to the longitudinal axis of the logging tool and being positioned in proximity to a wall of the borehole using a second extension member, the second direction and the first direction having an azimuthal difference selected to reduce a borehole effect.

20. The non-transitory computer-readable medium produce product of claim 19 further comprising at least one of: (i) a magnetic medium, (ii) a RAM, (iii) a ROM, (iv) an EPROM, (v) an EAROM, (vi) a flash memory, and (vii) an optical disk.

* * * * *